(12) United States Patent
Davies et al.

(10) Patent No.: US 6,751,414 B1
(45) Date of Patent: Jun. 15, 2004

(54) CIRCUIT AND CHANNEL ASSIGNMENT PLAN FOR OPTICAL TRANSMISSIONS

(75) Inventors: Fiona Davies, Bishops Stortford (GB); Nigel Edward Jolley, Harlow (GB); Kevan Jones, Totnes (GB); Robert Keys, Kanata (CA); Maurice O'Sullivan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/111,490

(22) Filed: Jul. 7, 1998

(30) Foreign Application Priority Data

Jul. 18, 1997 (GB) .............................................. 9715268

(51) Int. Cl.[7] .............................................. H04B 10/24
(52) U.S. Cl. .......................................... 398/41; 398/42
(58) Field of Search ................................. 359/114, 127, 359/130, 161, 177, 349; 398/41, 42, 82, 84, 87, 158, 88

(56) References Cited

U.S. PATENT DOCUMENTS

| | | | |
|---|---|---|---|
| 4,556,293 A | * 12/1985 | Burns et al. ................... 385/11 |
| 4,931,959 A | * 6/1990 | Brenner et al. ............. 359/107 |
| 5,295,209 A | * 3/1994 | Huber ......................... 385/37 |
| 5,541,766 A | * 7/1996 | Mizrahi et al. ............. 359/337 |
| 5,546,210 A | * 8/1996 | Chraplyvy et al. ......... 359/124 |
| 5,589,969 A | * 12/1996 | Taga et al. ................... 359/124 |
| 5,633,741 A | * 5/1997 | Giles ........................... 359/124 |
| 5,638,473 A | * 6/1997 | Byron ........................... 385/37 |
| 5,696,614 A | * 12/1997 | Ishikawa et al. ............. 359/124 |
| 5,742,416 A | * 4/1998 | Mizrahi ....................... 359/134 |
| 5,801,858 A | * 9/1998 | Roberts et al. ............. 359/114 |
| 5,812,567 A | * 9/1998 | Jeon et al. ..................... 372/6 |
| 5,912,751 A | * 6/1999 | Ford et al. ..................... 398/46 |
| 6,002,504 A | * 12/1999 | Tillerot et al. ............... 359/172 |
| 6,043,914 A | * 3/2000 | Cook et al. ................... 359/124 |
| 6,049,417 A | * 4/2000 | Srivastava et al. .......... 359/341 |
| 6,055,081 A | * 4/2000 | Koyano et al. ............. 359/161 |
| 6,064,514 A | * 5/2000 | Aoki et al. ............. 359/341.43 |
| 6,081,368 A | * 6/2000 | Delavaux ..................... 359/341 |
| 6,118,563 A | * 9/2000 | Boskovic et al. ........... 359/124 |
| 6,466,345 B1 | * 10/2002 | Bousselet et al. ........... 359/130 |

OTHER PUBLICATIONS

Cooper et al., US 2002/0025097, Feb. 28, 2002, p. 9.*

* cited by examiner

*Primary Examiner*—Leslie Pascal
*Assistant Examiner*—Dalzid Singh
(74) *Attorney, Agent, or Firm*—Barnes & Thornburg

(57) ABSTRACT

To support interleaving of optical channels and to provide sufficient isolation between such interleaved channels, a circulator (60–62) receives, on an optical fiber (16–18), a broadband signal containing a plurality of adjacent channels. The circulator selectively routes the broadband signal through a filter (64, 66) to isolate, on an individual basis, at least one desired channel. A filtered signal, corresponding to the at least one desired channel, is then output from the filter (64–66) and reflected back into the filter by a mirror (68–70) such that the at least one desired channel is subjected to a second filtering process that further improves isolation of the at least one desired channel. Following this second filtering process, the at least one desired channel is applied to the circulator (60–62) for re-inserting into the optical fiber (16–18), as illustrated in FIG. 6. To mitigate the effects of four-wave mixing in each bidirectional optical fiber, a channel assignment plan ensures that pairs of adjacent channels are assigned on a mutually exclusive basis to at least one of an up-link and a down-link direction.

24 Claims, 3 Drawing Sheets

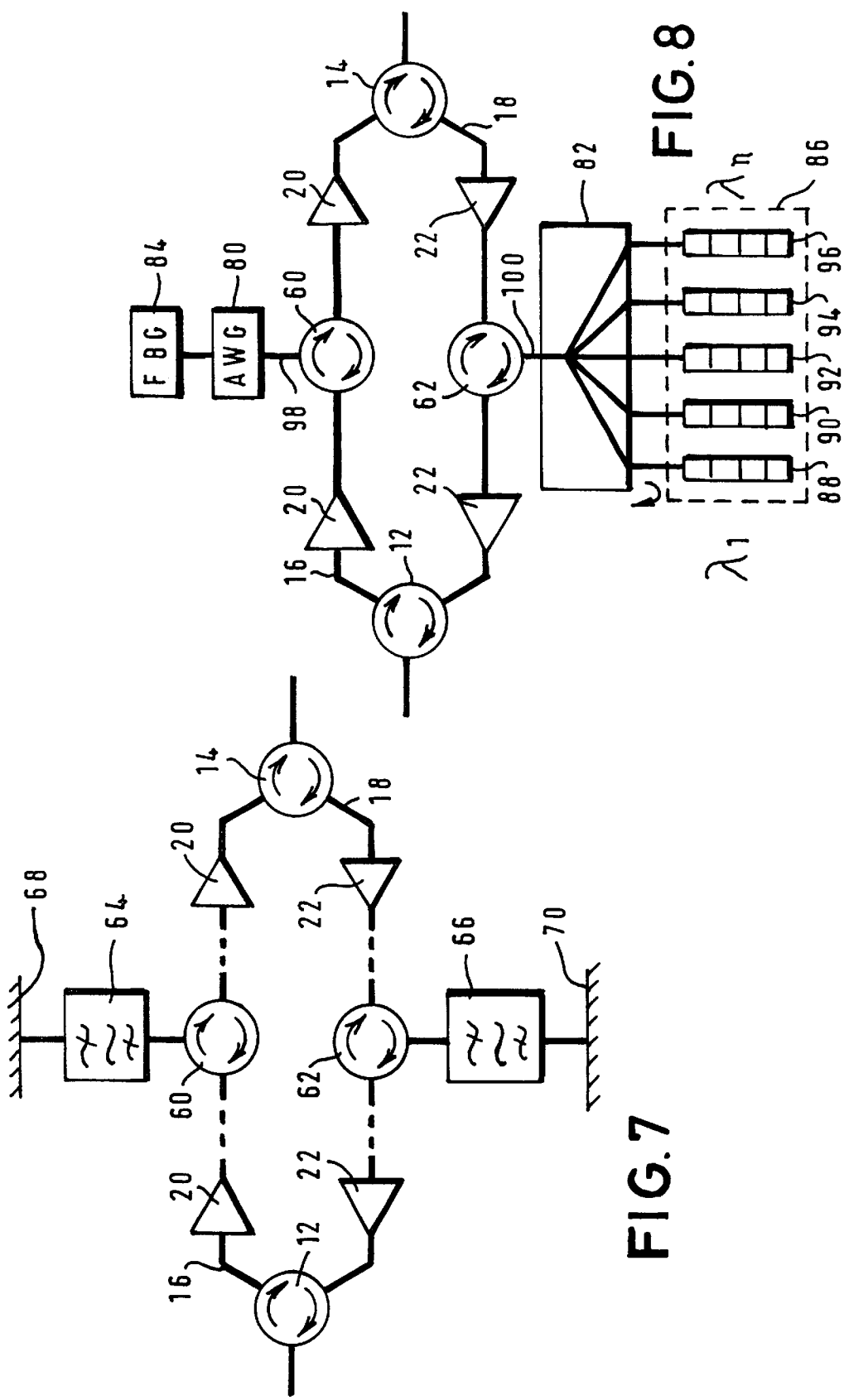

CIRCUIT AND CHANNEL ASSIGNMENT PLAN FOR OPTICAL TRANSMISSIONS

BACKGROUND TO THE INVENTION

This invention relates, in general, to an optical transmission plan and optical amplifier circuit therefor, and is particularly, but not exclusively, applicable to a bi-directional wave division multiplexed (WDM) amplifier circuit and a channel assignment plan for optical transmissions therein.

SUMMARY OF THE PRIOR ART method of increasing the transmission capacity of an optical fibre is to use wavelength division multiplexed (WDM) channels. Indeed, in this respect, optical amplifier designs have been optimised for WDM operation. For example, in uni-directional systems, all the WDM channels will be transmitted through the transmission fibre in the same direction, while an alternative, bidirectional transmission configuration has some channels within the fibre travelling in one direction and other channels travelling in an opposite direction. This latter system configuration offers a number of advantages, especially in relation to the number of redundant transmission terminals required for reliability. As such, optical amplified designs are currently being optimised for bidirectional transmission.

One particular mechanism by which bidirectional transmission are optimised is provided by splitting the available channels into distinct operating bands, one for each direction. These bands are sometimes referred to as the 'blue' and 'red' bands, and can contain varying numbers of channels. For example, the blue band may have channels based within a wavelength range of 1527 to 1540 nanometres (nm), while the red band may have channels based within a wavelength range of 1545nm to 1560nm. Each channel supports information transfer through the modulation of data onto a carrier frequency (generated by a laser). In an optical system, typical modulation techniques include amplitude and phase modulation, and frequency shift keying (FSK).

As will be understood, WDM channel allocation is typically based on the International Telecommunications Union (ITU) standardised wavelength grid, and is therefore subject to specified minimum channel spacing. Specifically, the present ITU standard requires a channel spacing of 100 GigaHertz (GHz), with possible channel combinations using multiples of this 100 GHz channel spacing. In practice (and bearing in mind the constraints imposed by laser light resolution), each band can support sixteen channels having a 100 GHz spacing regime, i.e. thirty-two channels in total.

Unfortunately, as channel spacing decreases, each channel suffers from higher levels of performance degradation due to multi-channel operation. Specifically, the superposition of harmonics results in significant detrimental effects on data integrity within a specific channel. More particularly, in an optical transmission system, densely packed channels exhibit an intermodulation product, known as "four-wave mixing". Basically, the degradation from the intermodulation product arises from sidebands being superpositioned on or about adjacent optical channels, with each sideband generated as a consequence of the spacing between adjacent channels. Increasing the channel separation therefore improves transmitted signal integrity, but this improved performance only results from sacrificing overall transmission capacity.

One way to maintain the same total number of channels in a bidirectional amplifier, whilst reducing the channel degradation arising from an intermodulation product is to adopt an interleaved channel plan in which adjacent channels propagate in opposite directions. In practice, this means that the channel spacing between adjacent channels in one direction has been doubled, with the effects on adjacent co-propagating channels accordingly reduced. An additional advantage of this scheme arises from the distribution of the "dead band" in which channels cannot be used. Specifically, in relation to a dual band system in which distinct bands are allocated for up-link and down-link transmissions, it is imperative that the bands be separated, (isolated) to prevent corruption of data. Unfortunately, in any attenuated system (as implemented within a filter, for example) isolation is dependent on operating parameters of the actual attenuation devices. In the specific case of filters in an optical system, the filters have a response curve that gradually rises and gradually tails off. Consequently, a minimum extinction zone must exist between the separate channel bands, with the width of the extinction zone necessarily excluding any overlap potentially arising from the lead-in or tail-off profiles of the filter response characteristics. In other words, the rate of increase of attenuation against wavelength (termed "roll-off") that is achievable between the channel bands through filtering produces a portion of the bandwidth that cannot be used for communication information; this is the overlapping region of the "dead band". In an interleaved case, the channel spacing in one direction is doubled and so the filter edges are steep enough not to lose a channel slot due to dead bands. Indeed, in practice, the dead band is distributed across the whole of the operating bandwidth, and so the optical system is able to increase the total number of available channels.

Although it will now be understood that interleaving in an optical transmission system is desirable, the problems associated with the provision of a suitable optical amplifier discourage the implementation of such interleaved schemes. Specifically, the design of a suitable optical amplifier is presently both complex and expensive. Consequently, with the development of a new and improved architecture for an optical amplifier, interleaved optical transmission systems could and would be implemented more frequently, which systems would therefore provide an improvement in the standard, quality and rate of information transfer, as will be appreciated.

EP-A-0 680 168 describes a system and method for optimising spectral efficiency using time-frequency-code slicing. More particularly, through the scheduling of the various speed users within the frequency and time domains, the system and method allocates and makes use of the available spectrum.

EP-A-0 668 675 describes a multi-channel optical fibre communication system in which wavelength division multiplexed channels have simple channel-to-channel spacing which prevent substantial coincidence of 4-wave mixing products with channel carriers.

U.S. Pat. No. 5,390,043 describes an optical heterodyne communication system for transmission of multiple optical channels at different wavelengths, with the optical channels grouped into blocks. Spacing between optical channels with a block is equal to or somewhat greater than the channel bandwidth, while the spacing between blocks is such that when the optical signal is heterodyned with a local oscillator lightwave the interference with a selected optical channel from the adjacent block does not exceed a predetermined level.

SUMMARY OF THE INVENTION

According to a first aspect of the present invention there is provided a method of assigning a band of optical channels to an optical fibre arranged to support bidirectional communication in an up-link and a down-link, the band of optical channels having adjacent wavelengths, the method arranged to reduce intermodulation in each of the up-link and down-link by assigning to at least one of the up-link and the down-link at least one pair of channels having adjacent wavelengths in the band of optical channels, wherein assignment of channels to the up-link and down-link are mutually exclusive and each of the up-link and the down-link comprises at least one other optical channel having a wavelength not adjacent to said at least one pair of channels.

In particular embodiments, the optical channels in the up-link and down-link are separated by no more that two contiguous optical channels. Alternatively or additionally, at least one of the up-link and the down-link comprises at least two pairs of adjacent optical channels, the at least two pairs being separated by no more than two adjacent channels.

In a further aspect of the present invention there is provided an optical fibre supporting bidirectional communication on a multiplicity of optical channels having adjacent wavelengths, the multiplicity of optical channels distributed between an up-link and a down-link, the optical fibre supporting at least one pair of channels having adjacent wavelengths in at least one of the up-link and the down-link, wherein channels assigned to the up-link and down-link are mutually exclusive and each of the up-link and the down-link comprises at least one other optical channel having a wavelength not adjacent to said at least one pair of channels, whereby four-wave mixing in each of an up-link and a down-link is reduced.

The optical fibre may, in fact, be one of a plurality of similar optical fibres of an optical communication system.

In still yet another aspect of the present invention there is provided a method of bidirectional transfer of data through an optical fibre, the data conveyed in up-link and down-link directions in the optical fibre in a multiplicity of optical channels having adjacent wavelengths, the multiplicity of optical channels distributed between the up-link and the down-link directions, the method characterised by the steps of: assigning at least one pair of channels having adjacent wavelengths to at least one of the up-link and the down-link, wherein channels assigned to the up-link and down-link directions are mutually exclusive and each of the up-link and the down-link directions comprises at least one other optical channel having a wavelength not adjacent to said at least one pair of channels, whereby four-wave mixing in each of the up-link and down-link directions is reduced; and modulating channels to support simultaneous transfer of the data in the up-link and down-link directions.

In another aspect of the present invention there is provided a circuit responsive to a broadband optical signal supporting a plurality of channels, the circuit comprising: a directional coupler arranged to receive the broadband optical signals and configured to provide an output signal; a filter, responsive to the output signal, having a characteristic arranged to isolate from the output signal at least one desired channel on at least one filtered output; and a reflector coupled to the at least one filtered output and arranged to reflect the at least one filtered output back into the filter such that the at least one filtered output is subjected to a second filtering process that improves isolation of the at least one desired channel.

In yet another aspect of the present invention there is provided a method of isolating at least one desired optical channel from a broadband optical signal applied to a filter, the broadband optical channel supporting a plurality of channels and the filter having a characteristic arranged to isolate the at least one desired channel: filtering the broadband optical signal to produce a filtered output signal containing the at least one desired channel; and re-filtering the filtered output signal in the filter to isolate further the at least one desired channel.

DESCRIPTION OF THE DRAWINGS

Exemplary embodiments of the present invention will now be described with reference to the accompanying drawings, in which:

FIG. 7 shows a block diagram of an alternative embodiment of the present invention in which a double pass of an optical filtering element is achieved; and FIG. 8 shows a block diagram of yet another alternative embodiment of the present invention in which a double pass of an optical filtering element is achieved.

DETAILED DESCRIPTION OF A PREFERRED EMBODIMENT

Figure 1:
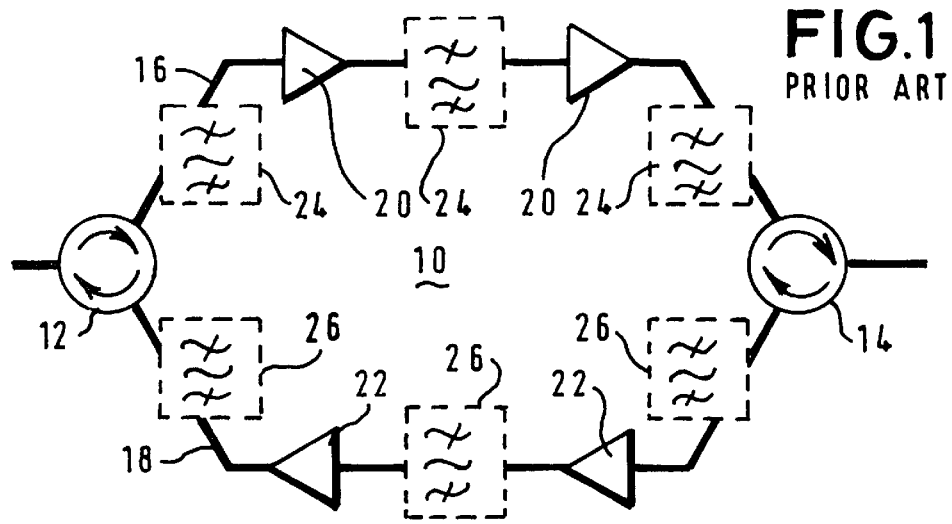
FIG. 1 illustrates a block diagram of a prior art optical amplifier.

For a bidirectional optical transmission, an aspect of the present invention has identified several channel allocation schemes that generally reduce interference from that associated with a conventional single interleaved structure in which alternate (rather than adjacent) carrier frequencies are assigned to the up-link or down-link communication paths. The conventional interleaved structure is identified as scheme A in Table 1 below. As a key to understanding the channel allocation scheme presented in the table, channel number that are shown in italic underlining are all unidirectional channels and, as such, are each assigned (on a mutually exclusive basis) to either the up-link or down-link. For example, in scheme A, channel numbers 1+2n (where n is zero or a positive integer) are all assigned to the down-link, while channel numbers 2+2n (where n is zero or a positive integer) are all assigned to the up-link. Clearly, it is an arbitrary decision whether these channel allocation are reversed for the up-link and down-link.

TABLE 1

| Scheme | Channel Number | | | | | | | | | | | | | | | |
|---|---|---|---|---|---|---|---|---|---|---|---|---|---|---|---|---|
| A | 1 | *2* | 3 | *4* | 5 | *6* | 7 | *8* | 9 | *10* | 11 | *12* | 13 | *14* | 15 | *16* |
| B | 1 | 2 | *3* | *4* | 5 | 6 | *7* | *8* | 9 | 10 | *11* | *12* | 13 | 14 | *15* | *16* |
| C | 1 | *2* | *3* | 4 | 5 | *6* | *7* | 8 | 9 | *10* | *11* | 12 | 13 | *14* | *15* | 16 |

TABLE 1-continued

| Scheme | Channel Number | | | | | | | | | | | | | | | |
|---|---|---|---|---|---|---|---|---|---|---|---|---|---|---|---|---|
| D | 1 | 2 | _3_ | 4 | _5_ | _6_ | 7 | 8 | _9_ | _10_ | 11 | _12_ | 13 | 14 | _15_ | _16_ |
| E | 1 | _2_ | 3 | _4_ | 5 | _6_ | _7_ | 8 | 9 | _10_ | 11 | _12_ | 13 | _14_ | _15_ | 16 |

→$I_0$

Although Table 1 is indicative of a sixteen channel system, the patterns provided in relation to the channel allocation mechanisms of scheme B though scheme E can be extended or truncated to systems containing, respectively, more or fewer channels, as will be understood. The channels may be evenly spaced, but in all cases an increasing channel number is indicative of an increased wavelength of a channel carrier. Additionally, although the up-link and down-link are considered to contain the same numbers of channels, this need not be the case. Furthermore, it is assumed that the fibre design parameter lambda zero ($I_0$) is located beyond, i.e. at a longer wavelength, the largest channel number. As will be understood, the efficiency or effectiveness of four-wave mixing also depends upon a relative positioning of each channel in relation to $I_0$, with reduced intermodulation products (from non-coherent combinations) occurring with a lengthening in distance away from $I_0$.

In the specific instances of schemes B, C, D and E of Table 1, it can be seen that their individual channel allocation schemes are arranged to produce a reduced four-wave mixing through the provision, in each of the up-link and down-link, of at least one pair of contiguous channels (from an available operating spectrum), with the channels in the up-link and down-link being mutually exclusive. Furthermore, in terms of the channel spacing, there is no more that a separation of two contiguous channels from a respective sequence of channels for either the up-link or down-link. Thirdly, there is a separation of at least two adjacent channels between adjacent contiguous pairs of directionally similar channels, perhaps best demonstrated in relation to schemes B and C of Table 1.

Generally, in relation to the channel allocation schemes of Table 1, sidebands of an intermodulation product are not successively superimposed on the evenly spaced channels because the variations in channel separation reduce the four-wave mixing phenomena.

Referring now to FIG. 1, a block diagram of a prior art optical amplifier circuit 10 is illustrated. Specifically, the optical amplifier circuit 10 contains a circulator 12–14, a WDM splitter or another equivalent component that isolates and then routes incident signals in an identified directions only (hereinafter generically termed "directional couplers") at the respective inputs to the alternate transmission paths 16–18.

As will be understood, the circulators 12–14 operate on a directional basis and provide separation of bi-directional signals whilst maintaining isolation between the bi-directional components of the incident data transmissions. In other words, the circulators 12–14 operate to direct communication traffic (supported on the optical channels) along a predefined path and therefore to prevent a first path 16, e.g. an up-link, from merging and interfering with a second path 18, e.g. a down-link, at a circuit juncture.

The optical amplifier circuit 10 further includes a separate amplification module 20–22, typically having two amplification stages, for each direction 16–18. Furthermore, in order to isolate and correctly amplify the separate directional band, filters 24–26 must be included to attenuate unwanted optical channels associated with the directionally opposing transmission path. These filters 24–26 therefore necessarily operate in a selective bandpass mode, and typically take the form of a comb filter, or the like, that is arranged to eliminate undesired wavelengths (i.e. channels). For example, in the case of the regular interleaved channel allocation scheme A (of Table 1), the comb filter is arranged to screen out the carrier frequencies associated with every other channel. Clearly, when considering both transmission paths 16–18, the combs on each filter 24–26 would have an inverse but complementary relation.

Typically, the amplification functions are provided by broadband gain (amplification) blocks having Erbium window profiles, while the filters are constructed from components that allow light to propagate in a single direction, as will be readily appreciated. For example, the filters are more typically realised by a multi-layer optical dielectric filter that exhibits local transmission/reflection properties, or waveguide devices or transmissive Bragg gratings. The filters 24–26 of FIG. 1 can, however, be located at a number of alternative positions in each transmission path 16–18 of the optical amplifier circuit 10. This is indicated in the diagram by the fact that the filters 24–26 are shown in dotted outline. Specifically, a filter can be positioned before the amplification module, between the amplification stages (perhaps at an intersection position), or after a second one of a pair of serially coupled amplification stages. Each different position does, however, effect the performance of the optical amplifier circuit in a different way. Specifically, if amplification occurs before the first amplification module, there is a direct impact on amplifier noise performance that arises from noise being amplified; this is clearly undesirable. Placing a filter 24–26 between the amplification stages provides an optimum performance solution, while placing a filter 24–26 after the second serially coupled amplification stage impacts the obtainable maximum output power from the optical amplifier circuit 10. The latter case is particularly attractive when considering a modular approach to circuit design in which two unidirectional amplifiers are combined using an add-on circulator/filter arrangement to produce the bidirectional optical amplifier circuit of FIG. 1.

Providing an appropriate and requisite amount of filtering for the optical amplifier circuit of FIG. 1 is a key design issue. In this respect, the specification for the comb filter must take into account two limitations, namely the need to prevent oscillation in the region of overlap between the two combs and the extinction (isolation) required in the rejected channels to limit sufficiently the adverse effects of multipath interference (usually considered to be ~50 decibels (dB) net round trip loss).

Figure 2:
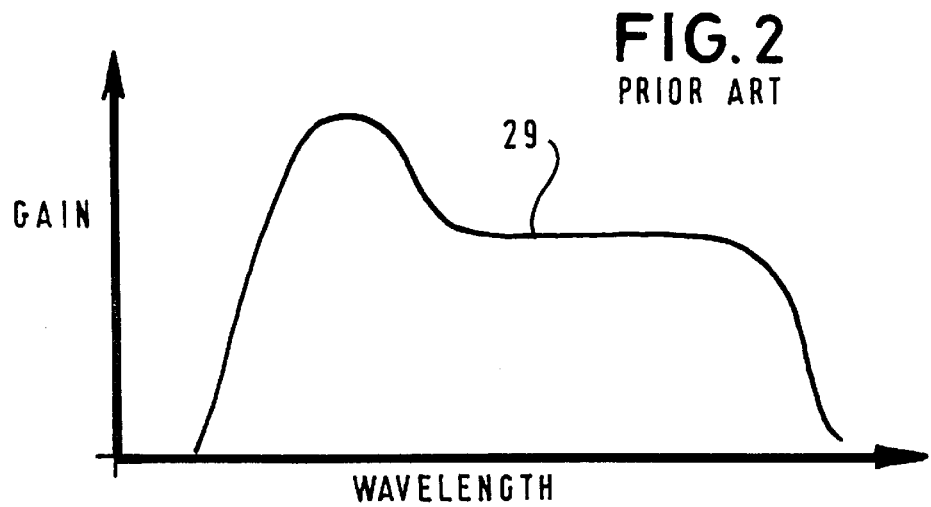
FIG. 2 illustrates a typical profile for an Erbium window.

FIG. 2 illustrates a typical profile 29 for an Erbium window that demonstrates how amplification (gain) varies with wavelength, I. Specifically, after a fairly rapid parabolic rise to a maximum gain at about 15% of the window, there is a parabolic drop off in gain until, at about 30%, a substantially uniform gain is achieved for a significant portion of the remaining Erbium window. Gain then tails off rapidly.

Figure 3:
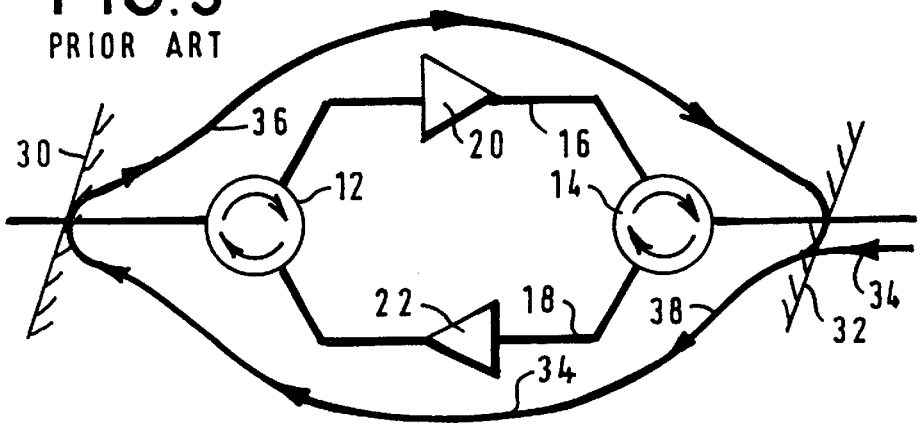
FIG. 3 illustrates the oscillation and multi-path interference routes in the optical amplifier circuit of FIG. 1.

FIG. 3 illustrates the oscillation and multi-path interference routes in the optical amplifier circuit of FIG. 1. As can be seen, FIG. 3 ostensibly corresponds to the structure previously described in relation to FIG. 1, although a pair of optical connectors 30–32 are coupled to circulators 12–14 and define an edge for the optical amplifier circuit 10. The pair of optical connectors 30–32 each typically exhibits a maximum reflection level between a transmission fibre and the optical amplifier circuit defined by the Bellcore standard, i.e. a level of −24 dB. Consequently, assuming that an optical channel 34 is incident on a first one of the pair of optical connectors, e.g. reference numeral 30, then the optical channel passes 34 through circulator 14, along transmission path 18, through a series combination of amplification module 22 and circulator 12 before being reflected by a second one of the pair 30 and back along transmission path 16. Similarly, a reflected signal 36 originating from the optical channel 34 passes through circulator 12, a series combination of amplification module 20 and circulator 14 before undergoing a second refection 38 (back along transmission path 16) at the first one of the pair of optical connectors 30.

Figure 4:
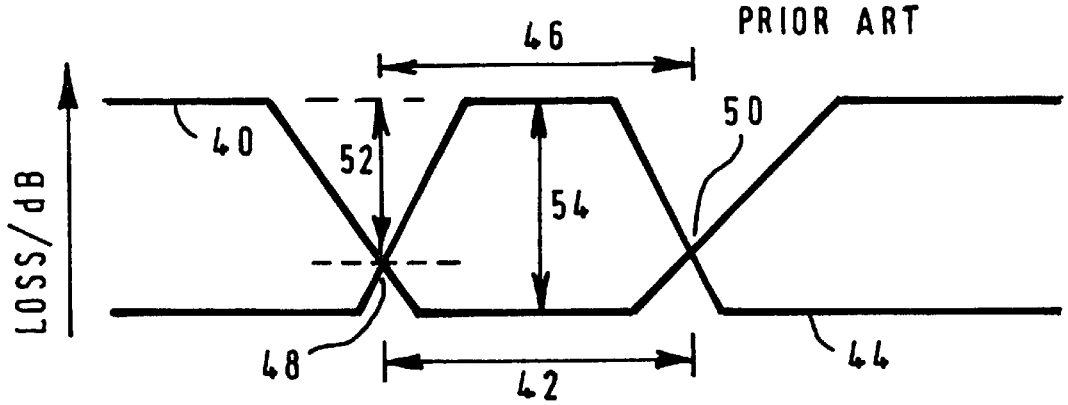
FIG. 4 illustrates a filter characteristic that satisfies the operational requirements of a bidirectional WDM amplifier arrangement of a preferred embodiment of the present invention.

FIG. 4 illustrates a filter characteristic that satisfies the operational requirements of a bi-directional WDM amplifier arrangement of a preferred embodiment of the present invention. The filter characteristic (a plot of loss against wavelength) is, however, illustrated in an exaggerated format. More particularly, two filter characteristics are actually shown and with their respective pass bands superimposed (one on the other) to illustrate the combined properties of the filter. In other words, a filter characteristic 40 for an up-link has a passband 42 corresponding to a stop-band for a second filter characteristic 44 for a down-link. First and second points of intersection 48–50 between the first filter characteristics 40 and the second filter characteristic 44 represent a most favourable position for oscillation (i.e. a position where the entire circuit offers sufficient gain in a round-trip path), with these points of intersection provided at a first level 52 corresponding to a difference in loss between the stop-band 46 of the second filter characteristic 44 and the point of intersection of the respective first and second filter characteristics. For the sake of the preferred embodiment, the first level 52 has a considered to have a level of −5 dB for stable operation. A second level 54 corresponding to the difference in loss between the stop-band 46 of the second filter and the passband of the first filter characteristic is associated with an isolation level required to address the effects of multi-path within the optical amplifier circuit.

As will be understood, oscillation in an optical circuit comprised from reflectors and amplifiers is most likely to occur at a point of highest gain, i.e. corresponding to the points of intersection 48–50 of FIG. 4. Specifically, in the event that oscillation occurs, the circular path (illustrated in FIG. 3) between reflectors acts as a cavity, whereby the circuit acts as a laser. Consequently, spurious power is distributed across the frequency spectrum causing disruption of data integrity. Multi-path interference arises from the destructive combination of identical signals that have travelled different paths through the optical circuit.

It has been identified that the characteristics for operation of the optical amplifier circuit of the present invention must satisfy a requirement of 35dB gain per direction and −24 dB reflectivity at the input and output stages to the amplification module. Consequently, to avoid oscillation, the points if intersection 48–50 of the filter characteristics of FIG. 4 must satisfy the following calculation:

35 dB+35 dB+(−24 dB)+(−24 dB)−(first level, 52)<−5 dB →first level 52 of filter characteristic>27 dB To achieve an acceptable level of multi-path interference, i.e. 1%, the following calculation must be satisfied:

35 dB+35 dB+(−24 dB)+(−24dB)−(second level, 54)<50 dB →second level 54 of filter characteristic>72 dB To date, present techniques have been unable to satisfy this isolation performance, but the present invention has identified a mechanism by which a loss specification for a fibre-based Bragg grating device can be improved sufficiently through either the cascading of such gratings or through the realisation of a double pass through a filter.

Figure 5:
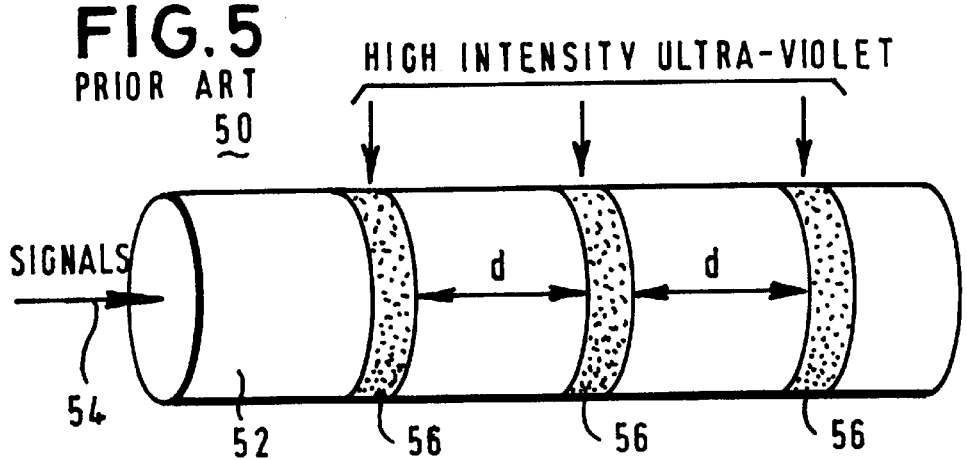
FIG. 5 illustrates a prior art fibre-based Bragg grating.

A fibre-based Bragg grating 50 is illustrated in FIG. 5. The Bragg grating comprises a photosensitive optical fibre 52 that is arranged to receive incident optical signals 54. To produce the Bragg grating 50, a series of high refractive index steps 56 (relatively high with respect to a refractive index of the fibre 52) may be equidistantly spaced (at a distance d) through the photosensitive optical fibre 52, although the Bragg grating may be chirped. These high index steps 56 are illuminated by a high intensity light beams, typically of an ultra-violet wavelength (e.g. ~200 nm). The spacing between the index steps determines the reflective or transmissive properties of the grating, as will be understood. The multitude of index steps in the Bragg diffraction grating could be of the same width.

Figure 6:
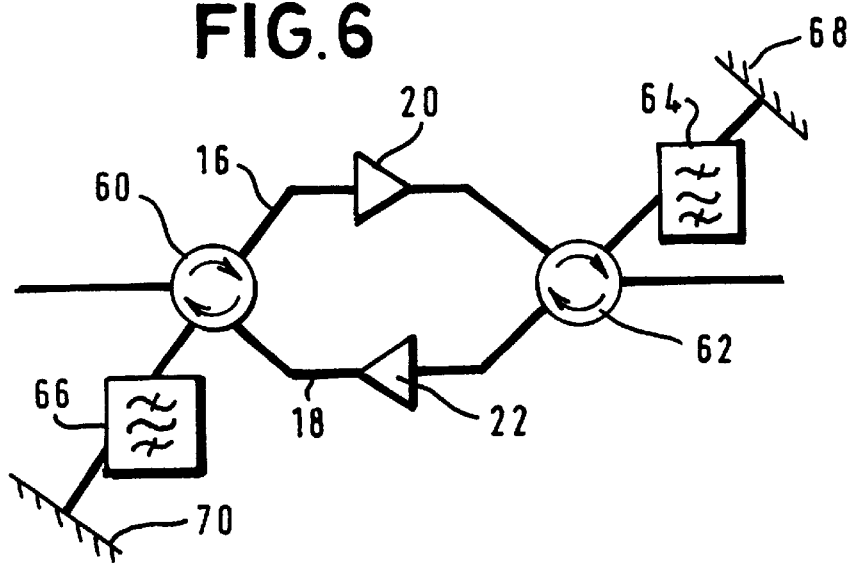
FIG. 6 shows a block diagram of a preferred embodiment of the present invention in which a double pass of an optical filtering element is achieved.

According to the present invention, a double pass of the filtering elements can be achieved by the circuit designs shown in FIG. 6 and FIG. 7.

Referring to FIG. 6, an optical amplifier circuit is shown, which circuit is substantially similar to that previously described in relation to FIG. 1. In this respect, therefore, elements in FIG. 6 that are common with FIG. 1 share common reference numerals. However, in relation to the location of the filters 24–26, these filter are not now in series with the amplification modules 20–22, but instead are positioned relative to four-port circulators 60–62. More specifically, in each of the respective transmission paths 16 and 18, a serially coupled combination of a comb transmission filter 64–66 and a broadband mirror 68–70 tap the respective four-port circulators 60–62 and give a double pass through the filter. Therefore, a signal (or channel) that is applied to an input of the four-port circulator from a particular transmission path is filtered through an appropriate comb transmission filter, reflected from the associated broadband mirror, filtered for a second time in the comb transmission filter to improve isolation, and then re-inserted into the transmission path by the four-port circulator.

If a modular system is desired, then the preferred embodiment of FIG. 6 can be modified to take on the appearance of FIG. 7. In this case, the four-port circulator serves as an extra circulator to the basic design of FIG. 1, which extra four-port circulator is inserted between distinct amplification stages of the respective up-link and down-link transmission paths. In this case, the amplification stages may be recognised by discrete circuit elements, which amplification stages may be separated by a considerable distance and, perhaps, be supported on different fibres. Routing of the signal through the four-port circulator is identical to the mechanism described in relation to FIG. 6.

In yet another embodiment of the present invention, a WDM demultiplexer can be combined with a wavelength selective reflector to replace the comb transmission filters; this is shown in FIG. 8. Specifically, but based on the general structures of FIG. 1 and FIG. 7, each comb transmission filters 64–66 of FIG. 7 is replaced by a series combination of an array waveguide (AWG) WDM demodulator/modulator 80–82 and a reflector 84–86, such as implemented as a plurality of parallel fibre Bragg gratings 88–96. Therefore, a broadband input 98–100 (provided by an appropriate circulator 60–62 and containing adjacent channels $I_1$ to $I_n$) to the WDM demodulator/modulator 80–82) is split into selected individual channels (based on wavelength), which individual channels are then applied to corresponding, wavelength dependent fibre Bragg gratings (or an equivalent form of reflector) for reflection back through the WDM demodulator/modulator 80–82. As such, the selection of the individual channels in the corresponding AWG WDM 80–82 and their passages through the AWG WDM 80–82 provide the necessary levels of isolation. The multiplexer of the AWG WDM then acts to recombine the selected channels into a broadband signal that can be applied to a single fibre. As will be appreciated, alternative technologies could be used for the comb transmission filters, WDM multiplexers and the wavelength selective reflectors. Again, in relation to the specific embodiments described in FIGS. 6 to 8 and for the sake of brevity, filtering components have been shown to be in positions relative to the amplifier (for the purposes of explanation and illustration only). In each case, the filtering components could be before, half-way along or after each amplification module, as expressly detailed and shown in relation to FIG. 1.

The present invention there advantageously provides a mechanism of assigning optical channels to reduce the effects of four-wave mixing, and realises an optical amplifier circuit that can isolate interleaved optical channels to an extent whereby a practical, bidirectional WDM amplifier can be manufactured at relatively low cost. Indeed, the mechanism of assignment is inherently applicable to bidirectional data transfer requiring modulation of a carrier in each channel.

It will, of course, be understood that the above description has been given by way of example only and that modifications in detail may be made within the scope of the present invention. For example, the filters of FIG. 6 and FIG. 7 could be implemented from waveguide devices, dielectric filters or transmissive Bragg gratings, but all of these are unable to meet the extinction specification in a single pass design and so a double pass of a comb shaped filter would be required, as described above. An alternative structure to the solitary transmissive Bragg grating or dielectric filter, would also be realised by a combination of a serial comb filter and a notch filter. Such a combination would increase the rejection of unwanted signals to a level sufficiently high or realise a bidirectional WDM amplifier.

Also, in relation to the channel assignment plans of the first aspect of the present invention, it will be appreciated that the capacity of an optical fibre could be sub- optimum by selectively leaving out channels and hence widening adjacent channel pair separation. However, the concept of having mutually exclusive pairs of channels assigned (on a sequential basis) to at least one of the up-link and the down-link is still applicable. Of course, it will be further appreciated that in any communication scheme the frequency separation between each pair of channels is preferably as small as possible to ensure optimal use of the limited bandwidth while avoiding adjacent channel interference.

What is claimed is:

1. A method of assigning a band of optical channels to an optical fibre arranged to support bi-directional communication, the band of optical channels having adjacent wavelengths, the method arranged to reduce four-wave mixing in each of an up-link and a down-link by assigning to at least one of the up-link and the down-link at least one pair of channels having adjacent wavelengths in the band of optical channels, wherein assignment of channels to the up-link and down-link are mutually exclusive and each of the up-link and the down-link comprises at least one other optical channel having a wavelength not adjacent to said at least one pair of channels.

2. The method of claim 1, wherein the optical channels in the up-link and down-link are separated by no more that two contiguous optical channels.

3. The method of claim 1, wherein at least one of the up-link and the down-link comprises at least two pairs of adjacent optical channels, the at least two pairs being separated by no more than two adjacent channels.

4. The method of claim 1, wherein the optical channels each have a common bandwidth.

5. The method of claim 1, wherein the intermodulation is four-wave mixing.

6. The method of claim 1, wherein the assignment of channels between the up-link and the down-link is sequenced.

7. The method of claim 1, wherein the pairs of channels, although adjacent to one another, do not have contiguous frequency spectra.

8. An optical fibre supporting bi-directional communication on a multiplicity of optical channels having adjacent wavelengths, the multiplicity of optical channels distributed between an up-link and a down-link, the optical fibre characterised in that is supports at least one pair of channels having adjacent wavelengths in at least one of the up-link and the down-link, wherein channels assigned to the up-link and down-link are mutually exclusive and each of the up-link and the down-link comprises at least one other optical channel having a wavelength not adjacent to said at least one pair of channels, whereby four-wave mixing in each of the up-link and down-link is reduced.

9. A circuit responsive to a broadband optical signal supporting a plurality of channels, the circuit comprising:
   an optical circulator arranged to receive the broadband optical signals and configured to provide an output signal;
   a filter, responsive to the output signal, having a characteristic arranged to isolate from the output signal at least one desired channel on at least one filtered output; and
   a reflector coupled to the at least one filtered and arranged to reflect the at least one filtered output back into the filter such that the at least one filtered output is subjected to a second filtering process that improves isolation of the at least one desired channel, wherein the optical circulator is arranged to separate a bi-directional optical signal into two unidirectional signal, one carrying information on an uplink having a first subset of channels from the plurality of channels, the other unidirectional signal carrying information on a down-link comprising a second subset of channels from the plurality of channels, the first subset and the second subset having mutually exclusive channels.

10. The circuit of claim 9, wherein the circuit comprises two optical circulators interconnected by two optical fibres, a first optical fibre arranged to support the up-link and a second optical fibre arranged to support the down-link, and wherein each directional coupler has a filter and reflector associated therewith.

11. The circuit of claim 10, further comprising:
   a first amplification module coupled within the up-link and between the two optical circulators; and a second amplification module coupled within the down-link and between the two optical circulators.

12. The circuit of claim 11, wherein the filter in the up-link is coupled into the circuit after the first amplification module and the filter in the dawn-link is coupled into the second amplification module.

13. The circuit of claim 10, further comprising third and fourth optical circulators coupled respectively within the up-link and the down-link, the third optical circulator connected within the first amplification module and the fourth optical circulator connected within the second amplification module, and wherein the filter in the up-link is coupled to the third optical circulator and the filter in the down-link is coupled to the fourth optical circulator.

14. The circuit of claim 9, wherein the first subset and second subset have channels allocated hereto such that there is at least one pair of channels having adjacent wavelengths in at least one of the up-link and the down-link, and each of the up-link and down-link comprises at least one other optical channel having a wavelength not adjacent to said at least one pair of channels, whereby four-wave mixing in each of the up-link and down-link is reduced.

15. An optical communication system comprising at least one optical fibre supporting bi-directional communication on a multiplicity of optical channels having adjacent wavelengths, the multiplicity of optical channels distributed between an up-link and a down-link, the optical fibre supporting at least one pair of channels having adjacent wavelengths in at least one of the up-link and the down-link, wherein channels assigned to the up-link and down-link are mutually exclusive and each of the up-link and the down-link comprises at least one other optical channel having a wavelength not adjacent to said at least one pair of channels, whereby four-wave mixing in each of the up-link and down-link is reduced.

16. A method of bi-directional transfer of data through an optical fibre, the data conveyed in up-link and down-link directions in the optical fibre in a multiplicity of optical channels having adjacent wavelengths, the multiplicity of optical channels distributed between the up-link and the down-link directions, the method characterised by the steps of:

assigning at least one pair of channels having adjacent wavelengths to at least one of the up-link and the down-link, wherein channels assigned to the up-link and down-link directions are mutually exclusive and each of the up-link and the down-link directions comprises at least one other optical channel having a wavelength not adjacent to said at least one pair of channels, whereby four-wave mixing in each of the up-link and down-link directions is reduced; and modulating channels to support simultaneous transfer of the data in the up-link and down-link directions.

17. An amplifier circuit for an optical communication supporting bi-directional communication on a multiplicity of optical channels having adjacent wavelengths, the amplifier circuit being arranged such that the multiplicity of optical channels are distributed between an up direction and a down direction and being arranged to provide at least one pair of channels having adjacent wavelengths in at least one of the directions wherein channels assigned to each direction are mutually exclusive and in each of the directions there is at least one other optical channel having a wavelength not adjacent to said at least one pair of channels, whereby four-wave mixing is reduced.

18. The amplifier circuit of claim 17 having optical circulators for separating the up direction link channels from the down direction channels, the circuit further having optical amplifiers for amplifying the up direction and down direction channels separately.

19. The amplifier circuit of claim 18 further having filters for filtering each of the separated channels, to attenuate unwanted wavelengths.

20. The amplifier circuit of claim 19, such that optical paths of the separated channels pass a second time through their respective one of the filter.

21. Apparatus for an optical communication system, the system having at least one optical fibre coupled to the apparatus, the apparatus being arranged to provide bi-directional communications in multiple optical channel, individual ones of the channels being for use in one direction along the fibre, the apparatus being arranged to provide at least one pair of channels having adjacent wavelengths for use in one and at least one other optical channel in each direction, having a wavelength not adjacent to said at least one pair of channels, whereby four-wave mixing in each of the up-link and down-link is reduced.

22. An amplifier circuit for use in wavelength division multiplexed optical communications system, the system having at least one fibre and being arranged to have optical channels in both directions over the fibre, the circuit having an amplifier for amplifying two or more groups of two or more adjacent optical channels having adjacent wavelengths, for transmission along the fibre in a down direction, the circuit further being arranged to interleave the amplified groups with others of the optical channels, received in an up direction from the fibre.

23. The amplifier circuit of claim 22 having an optical circulator for carrying out the interleaving.

24. The amplifier circuit of claim 22, the others of the optical channels having groups of two or more adjacent optical channels.

* * * * *